United States Patent Office 3,349,147
Patented Oct. 24, 1967

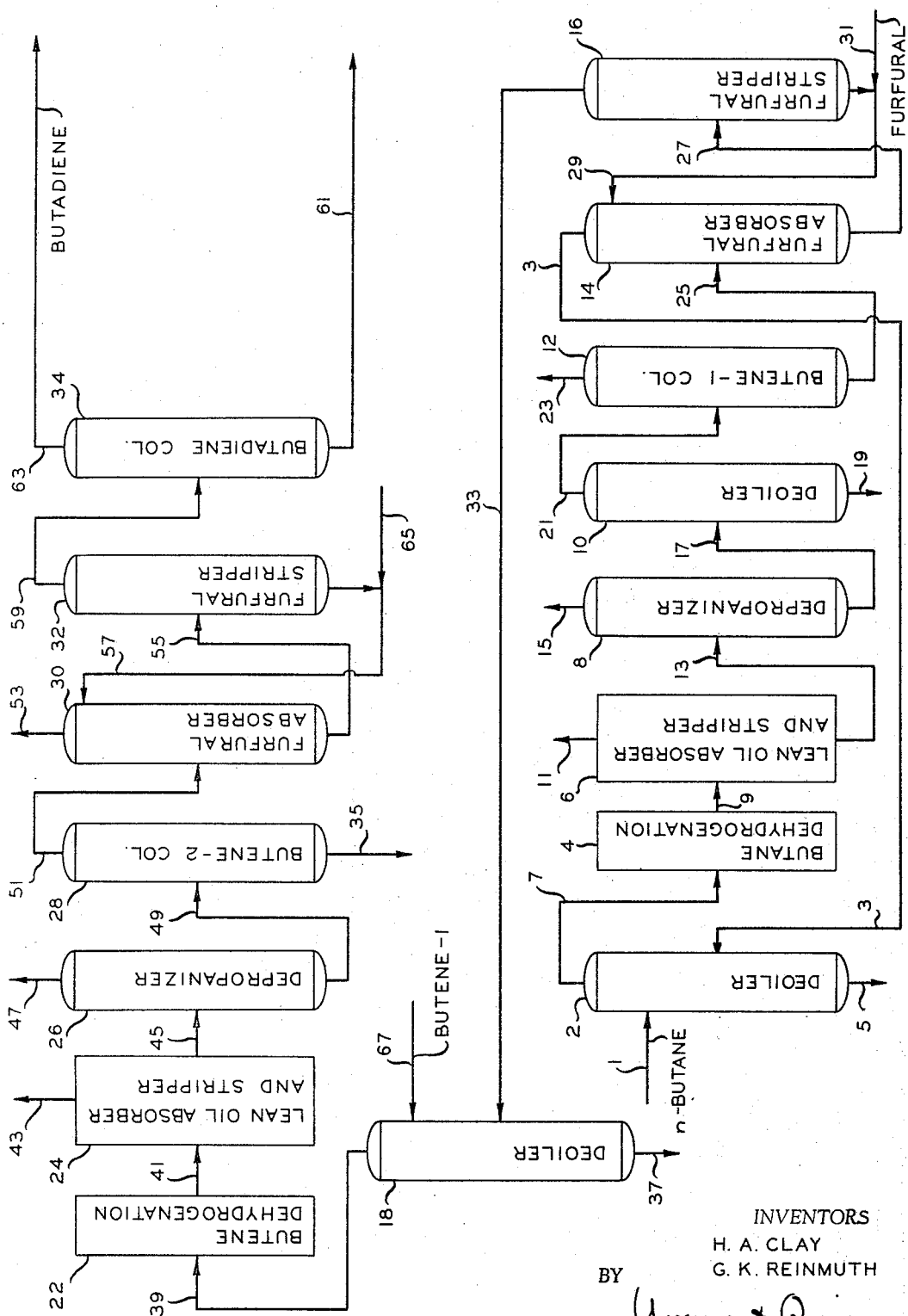

3,349,147
PURIFYING DEHYDROGENATION RECYCLE STREAM IN BUTADIENE MANUFACTURE
Harris A. Clay and Gene K. Reinmuth, Bartlesville, Okla., assignors to Phillips Petroleum Company, a corporation of Delaware
Filed Aug. 31, 1964, Ser. No. 393,111
11 Claims. (Cl. 260—680)

This invention relates to dehydrogenation. In one aspect this invention relates to preparation of feed to be dehydrogenated. In another aspect this invention relates to the production of butenes by dehydrogenating butane. In still another aspect this invention relates to a 2-stage dehydrogenation of normal butane to butadiene. In a further aspect this invention relates to improved recovery of desired materials formed by dehydrogenation.

Dehydrogenation of hydrocarbon streams to produce other desired hydrocarbons has been known and practiced for some time. In such processes it is highly desirable that the feed stream be substantially pure to improve the production of the desired hydrocarbons, prevent the formation of side products, prolong the catalyst life and make dehydrogenation operations more efficient. A well-known commercial process using dehydrogenation is the production of 1,3-butadiene. This process comprises dehydrogenating butane into butenes, purifying the butenes, dehydrogenating the butenes to butadiene, and recovering the butadiene produced. Conventional operation of such a process includes passing a stream consisting principally of normal butane, after removal of heavier materials, to a catalyst zone and passing the effluent therefrom after light gas removal to a butene-1 fractionation zone. The bottoms from the butene-1 zone containing principally normal butane and butene-2, after removal of any $C_5$ and heavier hydrocarbons, is then introduced into a distillation column wherein it is contacted with a solvent which selectively removes by extractive distillation the butene-2. Butene-2 is then recovered from the selective solvent by stripping and is combined with the butene-1 recovered from the butene-1 zone and used as feed to a second dehydrogenation zone. Normal butane recovered from the absorber zone is purified and returned to the first dehydrogenation zone. The effluent from the second dehydrogenation zone after light gas removal is fractionally distilled in a butene-2 column to remove butadiene from the normal butane, butene-2 and heavier hydrocarbons. The butadiene-containing stream is extracted with a selective solvent for recovery of the butadiene therefrom the latter being subsequently purified as a final product. The normal butane, butene-2 and heavier material-containing stream is treated for removal of the heavier hydrocarbons and then recycled to the second dehydrogenation zone.

In the operation of removing the heavier hydrocarbons from either the normal butane or butene recycle streams, columns operating as deoilers are employed which utilize cooling and condensation of all or at least a portion of the overhead stream with partial recycle as reflux to the column. Also in the normal operations of extractive distillation and purification of the desired materials, butene-2 and butadiene, from the dehydrogenation zones; impurities such as neopentane and methylacetylene remain with the desired products. These materials are contaminants in many of the uses of the desired products and may be particularly undesirable in a recycling type of operation as generally practiced.

We have now discovered that the deoiler columns may be operated in a more advantageous manner with considerable economic savings as to utility costs and improvement of operation of the columns. Also, the extraction columns may be operated in a more advantageous manner with reduced energy requirements, improved removal of contaminants and greater throughput.

Accordingly, it is an object of this invention to provide an improved process for dehydrogenation of hydrocarbons. Another object of this invention is to provide an improved method for operation of removing heavier than desired constituents from a dehydrogenation feed stream. A further object of this invention is to provide an improved process for the production of butenes from normal butane. Still another object of this invention is to provide an improved process for the 2-stage dehydrogenation of normal butane to butadiene and the recovery of the butadiene.

And a still further object of this invention is to provide an improved method for operation or steps of extracting the desired materials from dehydrogenation effluent. Other objects and advantages of this invention will become apparent to those skilled in the art upon further study of this disclosure, the drawing and appended claims.

In accordance with this invention, a stream to be fed to a dehydrogenation zone which contains heavy materials is fed to a column for removal of the heavier materials. A stream free from heavy materials containing material to be dehydrogenated is introduced as reflux to the column to aid in removing the heavier materials from the recycle stream thus avoiding the necessity of condensing the column's overhead vapors to provide reflux and thus wasting the heat energy contained therein.

Also, the extraction (absorber) columns are operated at a solvent-hydrocarbon ratio wherein the volatilities of the neopentane and methyl acetylene are such that they are removed in the most advantageous manner.

This invention will now be described in more detail by referring to the accompanying drawing which illustrates diagrammatically the dehydrogenation and separation process for converting normal butane to butadiene. Although this invention will be described in relation to the production of butadiene, it is to be understood that this invention is not limited to such a process and it is not intended that such be construed to be limited thereto. In the apparatus illustrated, various items of equipment such as valves, compressors, accumulators, heat exchangers and the like, have been omitted in order to simplify the drawing; however, the inclusion of such equipment can be readily accomplished by those skilled in the art.

Normal butane, obtained from natural gas or gasoline or other suitable source, is passed by means of conduit 1 into deoiler zone 2 as reflux thereto. When processing a $C_4$ stream, deoiler 2 will generally operate at a pressure within the range of from 45 to 250 p.s.i.a., at a top temperature within the range of from 100 to 230° F., and at a bottom temperature within the range of from 100 to 350° F. A stream containing normal butane and heavier (higher boiling) materials recovered from the process, later to be described, is introduced into deoiler zone 2 as feed thereto through conduit 3. The heavier materials are removed from deoiler 2 through conduit 5 and components are further removed therefrom as desired. Substantially pure normal butane is removed as overhead vapor from deoiler 2 through conduit 7 and introduced into butane dehydrogenation zone 4 where it is further preheated before being catalytically reacted. The effluent from dehydrogenation zone 4 removed through conduit 9 is passed to compression, liquefaction, flashing and lean oil absorption and stripping steps 6 for removal of materials lighter than $C_3$ hydrocarbons which may be used as fuel gas, etc. The heavier components are removed from zone 6 through conduit 13 and introduced as feed to depropanizer 8. Overhead material containing substantially $C_2$ and $C_3$ hydrocarbons are removed through conduit 15 and the remainder of the feed is removed through conduit 17 and passed to deoiler zone 10 wherein the heavier materials are removed through conduit 19 for recovery and use as desired. The $C_4$ fraction resulting therefrom is removed through conduit 21 and passed to a butene-1 column 12 wherein the butene-1, butadiene and lighter fraction is removed through conduit 23 and the remainder goes to a furfural absorber zone 14 through conduit 25. Stream 23 may be employed as stream 67 if butadiene concentration therein is low, or may be added as feed to extractive distillation column 30 for recovery of the butadiene therein. Extractive distillation solvent comprising furfural, water and oils is introduced to zone 14 through conduit 29. The unabsorbed material in zone 14, normal butane containing minor concentrations of furfural, oils and water, is removed as overhead through conduit 3 and introduced as feed to deoiler 2 as described above. The rich furfural stream is removed through conduit 27 and passed to stripper 16. Furfural recovered is removed through conduit 29. Make-up furfural as needed is introduced through conduit 31 to conduit 29. The overhead from stripper 16, containing substantially butene-2's with minor concentrations of furfural, oils and water, is removed through conduit 33 and introduced to deoiler zone 18 as feed. A stream containing substantially butenes is introduced through conduit 67 into deoiler zone 18 as reflux. When processing a $C_4$ stream, deoiler 18 will generally operate at a pressure within the range of from 45 to 250 p.s.i.a., at a top temperature within the range of from 100 to 230° F., and at a bottom temperature within the range of from 100 to 350° F. Heavy materials are removed from zone 18 through conduit 37 for recovery and use as desired and a vaporous stream containing substantially butene-1 and butene-2's is removed as overhead vapor from deoiler zone 18 through conduit 39 and introduced into butene dehydrogenation zone 22 where it is further heated before being catalytically reacted. Effluent from zone 22 passes via conduit 41 into compression, liquefaction, flashing and lean oil absorption and stripping steps 24. Materials lighter than $C_3$ hydrocarbons are removed through conduit 43 for use as fuel gas, if desired. The remainder of the dehydrogenation zone effluent is passed via conduit 45 to depropanizer zone 26 wherein $C_2$ and $C_3$ hydrocarbons are removed through conduit 47 for use as LPG, if desired, and the remainder of the feed passes through conduit 49 to butene-2 column 28. Butene-2 and heavier components are removed through conduit 35 for further purification and recycle to dehydrogenation zone 22. These butene-2's may be passed into deoiler 18 as feed. Overhead (butadiene and lighter components) from column 28 is passed through conduit 51 into furfural absorber 30. Furfural solvent is introduced to absorber 30 by conduit 57. An unabsorbed stream comprising substantially butene-1 with minor concentrations of furfural, oils and water is removed through conduit 53 and may be added as feed to deoiler 18, or super-fractionated to produce a high purity butene-1 stream which may be used as a polymerization feed stream, an alkylation feed and/or as reflux 67 to deoiler 18. The furfural-rich stream is passed through conduit 55 to furfural stripper 32. Furfural is removed therefrom through conduit 57. Make-up furfural as desired is introduced to conduit 57 through conduit 65. A butadiene-containing stream is recovered from stripper 32 via conduit 59 and introduced to butadiene column 34. High purity butadiene is removed as overhead from the column 34 through conduit 63 and the impurities are removed as bottoms through conduit 61 and may be processed for acetylenes removal, recycled as feed to deoiler 18 or otherwise utilized.

In the operation of furfural extractive distillation column 14, the introduction of solvent (comprising furfural, oils and water) to column 14 is maintained so that the solvent to hydrocarbon volumetric feed ratio is below 5.5:1 so that most of the neopentane entering column 14 is removed with the rich solvent stream via conduit 27 from which it is discharged from this recycling plant by conduit 37. Similarly in column 30, the solvent to feed ratio is maintained below 4:1 so that most of the methylacetylene entering absorber 30 is removed with the stream in conduit 53, thus causing it to be removed (after recycling through dehydrogenation zone 22) via conduit 47 of depropanizer 26. For the designated removal of neopentane and methylacetylene, it is necessary that the solvent to hydrocarbon volumetric ratios be maintained below individual critical ratios as herebelow defined. In column 14, by prior art methods of operation where relatively high solvent to feed ratios are employed, the volatilities of the olefinic hydrocarbons being fed are, in the column's liquid phase (solvent plus hydrocarbon) reduced to such a degree that the volatility of neopentane (a trace impurity in the commercial normal butane supplied to such a dehydrogenation-purification plant) relative to that of trans butene-2 is greater than 1.0. In this circumstance, most of the neopentane contained in the feed appears in the column's overhead product and recycles through the butane dehydrogenation-butene purification units being neither converted to other hydrocarbons nor removed (substantially) in a product stream, thus increasing progressively in concentration and inventory at certain plant locations thereby "building up in the recycle stream." Thus by operating at lower solvent to feed ratios (and thereby higher hydrocarbon concentration in column liquid) whereby the volatility of neopentane relative to that of trans butene-2 in the presence of the solvent decreases, neopentane is substantially removed from the recycle normal butane by way of streams 27 (along with the extracted butenes-2 in the solvent phase) being stripped therefrom as stream 33 and entering deoiler 18 and therein being rejected from the plant by stream 37. Thus, recycle accumulation of neopentane within the plant is avoided. The critical value of hydrocarbon concentration in column liquid at which the relative volatility of neopentane to trans butene-2 falls below 1.0 is difficult to ascertain, its being dependent upon solvent composition (water and oils in the furfural) and hydrocarbon feed composition. Therefore, a value of 5.5:1 solvent to feed ratio is established as a maximum value to cause a satisfactory separation of neopentane from normal butane to be made in the furfural extractive distillation column whose principal separation is that of butenes-2 from normal butane.

In column 30 operation, similarly, a maximum solvent to feed ratio is established to cause (in this case) rejection of methylacetylene in the unabsorbed butenes stream 53. Methylacetylene, being generated within the plant by the dehydrogenation reaction (particularly the dehydrogenation of butene feed), is intermediate between $C_3$ and $C_4$ hydrocarbons in normal volatility, and by virtue of its highly non-ideal distillation behavior in furfural extractive distillation column 30, in prior art practice, trace concentrations of methylacetylene often appear in purified butadiene stream 63 where it is undesirable for uses—such as lithium-catalyzed polymerizations. In this situation, a solvent to feed ratio of about 4:1 has been found to be a critical maximum value, in that plant operation below this value in column 30 will cause substantially all of the methylacetylene to be separated from the butadiene (which is absorbed by the solvent) along with substantially all of the butene-1 and some of the butenes-2. Physically, at solvent to feed ratios below 4:1 the volatility of methylacetylene relative to that of butadiene in the presence of the solvent increases to a value above 1.0 and causes a satisfactory separation to be made between methylacetylene and butadiene in the furfural extractive distillation column whose principal separation is that of butadiene from butene-1. To accomplish efficient operations of the absorbers to achieve the major separation in the desired degree with lowered solvent to feed ratios it is necessary to increase the number of trays (contacting steps) therein to effect the desired separations between the pairs of major components. The employment of lower solvent feed rates to the absorbers results in the additional advantage of allowing more hydrocarbon feed to be processed per column with a lowered expenditure of thermal and mechanical energy than in prior practice.

The following examples are presented in the form of material balances for the production of butadiene from normal butane; however, it is to be understood that such are not to limit the invention.

175 p.s.i.a., a top temperature of about 191° F., and a bottom temperature of from 195 to 230° F. Deoiler 18 is operated at a pressure of about 150 p.s.i.a., a top temperature of about 164° F., and a bottom temperature of from 170 to 230° F. The following material balance given in mols per hour of the various pertinent streams indicates the separations conducted in the various columns employed in this invention.

MATERIAL BALANCE
[Moles per hour]

| Stream | 1 | 3 | 5 | 7 | 9 | 11 | 13 | 15 | 17 | 19 | 21 | 23 | 25 |
|---|---|---|---|---|---|---|---|---|---|---|---|---|---|
| $H_2$ | | | | | 621.6 | 621.6 | | | | | | | |
| $C_1$ | | | | | 100.8 | 96.9 | 3.9 | 3.9 | | | | | |
| $C_2$ | | | | | 66.3 | 53.9 | 12.4 | 12.4 | | | | | |
| $C_3$ | | | | | 60.0 | 10.3 | 49.7 | 47.9 | 1.8 | | 1.8 | 1.8 | |
| Isobutane | 0.5 | | | 0.5 | 0.3 | | 0.3 | | 0.3 | | 0.3 | 0.3 | |
| n-Butane | 895.0 | 1,803.6 | 5.0 | 2,693.6 | 1,835.0 | | 1,835.0 | 7.2 | 1,827.8 | 3.5 | 1,824.3 | 10.6 | 1,813.7 |
| Isobutylene | | | | | 0.2 | | 0.2 | | 0.2 | | 0.2 | .2 | |
| 1-butene | | 6.1 | | 6.1 | 252.0 | | 252.0 | 7.2 | 244.8 | | 244.8 | 232.6 | 12.2 |
| Trans 2-butene | | 15.9 | | 15.9 | 286.0 | | 286.0 | 0.7 | 285.3 | 0.5 | 284.8 | | 284.8 |
| Cis 2-butene | | 1.7 | | 1.7 | 222.0 | | 222.0 | 0.3 | 221.7 | 0.5 | 221.2 | | 221.2 |
| Butadiene | | 0.3 | | 0.3 | 61.5 | | 61.5 | 2.3 | 59.2 | | 59.2 | 57.9 | 1.3 |
| Neopentane | 15.5 | 5.0 | 5.0 | 15.5 | 15.5 | | 15.5 | | 15.5 | 5.5 | 10.0 | | 10.0 |
| $C_5+$ | | 0.5 | 0.5 | | 5.0 | | 5.0 | | 5.0 | 4.0 | 1.0 | | 1.0 |
| Furfural | | 0.1 | 0.1 | | | | | | | | | | |
| Total | 911.0 | 1,833.2 | 10.6 | 2,733.6 | 3,526.2 | 782.7 | 2,743.5 | 81.9 | 2,661.6 | 14.0 | 2,647.6 | 303.4 | 2,344.2 |

| Stream | 33 | 35 | 67 | 37 | 39 | 41 | 43 | 45 | 47* | 49 | 51 | 53 | 59 | 61 | 63 |
|---|---|---|---|---|---|---|---|---|---|---|---|---|---|---|---|
| $H_2$ | | | | | | 1,084.0 | 1,084.0 | | | | | | | | |
| $C_1$ | | | | | | 210.0 | 210.0 | | | | | | | | |
| $C_2$ | | | | | | 30.0 | 25.0 | 5.0 | 5.0 | | | | | | |
| $C_3$ | | | | | | 65.0 | 8.0 | 57.0 | 50.0 | 7.0 | 7.0 | 7.0 | | | |
| Isobutane | | | | | | 2.0 | | 2.0 | | 2.0 | 2.0 | 2.0 | | | |
| n-Butane | 10.1 | 20.0 | 20.0 | | 30.1 | 32.2 | | 32.2 | | 32.2 | 12.2 | 12.2 | | | |
| Isobutylene | | | | | | 2.0 | | 2.0 | | 2.0 | 2.0 | 2.0 | | | |
| 1-butene | 6.1 | 20.0 | 420.0 | | 426.1 | 421.0 | | 421.0 | 33.0 | 388.0 | 368.0 | 367.7 | 0.3 | | 0.3 |
| Trans 2-butene | 268.9 | 386.5 | 387.7 | 0.9 | 652.7 | 441.0 | | 441.0 | 22.5 | 418.5 | 32.0 | 18.1 | 13.9 | 13.4 | 0.5 |
| Cis 2-butene | 219.5 | 313.9 | 311.0 | 1.0 | 529.5 | 335.0 | | 335.0 | 18.0 | 317.0 | 4.0 | | 4.0 | 4.0 | |
| Butadiene | 1.0 | 8.0 | 8.0 | | 9.0 | 370.0 | | 370.0 | 30.0 | 340.0 | 332.0 | 1.0 | 331.0 | 0.8 | 330.2 |
| Neopentane | 5.0 | 3.0 | 3.0 | 3.2 | 4.8 | 3.0 | | 3.0 | | 3.0 | | | | | |
| $C_5+$ | 0.5 | 4.0 | 4.0 | 4.5 | | 5.0 | | 5.0 | | 5.0 | 1.0 | | 1.0 | 1.0 | |
| Furfural | 0.1 | | | 0.1 | | | | | | | | | 0.1 | 0.1 | |
| Total | 511.2 | 754.5 | 1,150.7 | 9.7 | 1,652.2 | 3,000.2 | 1,327.0 | 1,673.2 | 158.5 | 1,514.7 | 760.2 | 410.0 | 350.3 | 19.3 | 331.0 |

*Contains substantially all of the methylacetylene present.

EXAMPLE I

In this example normal butane is dehydrogenated over an $Al_2O_3$-$Cr_2O_3$-MgO catalyst at about 1100° F. and 24 p.s.i.g. The recovered butenes are dehydrogenated over a $Fe_2O_3$-$Cr_2O_3$-$K_2O$ catalyst at about 1150° F. and 20 p.s.i.g. The process flows are conducted in a manner as shown in the drawing. Deoiler 2 is operated at a pressure of about

EXAMPLE II

In this example, material balances are given around the absorber columns, both for 100 tray and 200 tray column operation with solvent to hydrocarbon feed ratio below the maximum allowed to operate in accordance with this invention. The values of the constituents presented are expressed in gallons per hour based on 1000 gallons of feed per hour.

STREAM (ABSORBER 14)

| Component (gallons/hr.) | 100 Tray | | | | 200 Tray | | | |
|---|---|---|---|---|---|---|---|---|
| | 25 | 3 | 33 | 29 | 25 | 3 | 33 | 29 |
| n-Butane | 683 | 676 | 7 | | 683 | 676 | 7 | |
| 1-Butene | 6 | 4 | 2 | | 6 | 4 | 2 | |
| Trans-2-butene | 172 | 12 | 160 | | 172 | 12 | 160 | |
| Cis-2-butene | 133 | 4 | 129 | | 133 | 1 | 132 | |
| Neopentane | 6 | 4 | 2 | | 6 | 2 | 4 | |
| Oils | | | | 825 | | | | 616 |
| Furfural | | | | 5,050 | | | | 3,782 |
| Water | | | | 805 | | | | 602 |
| Total | 1,000 | 700 | 300 | 6,680 | 1,000 | 695 | 305 | 5,000 |
| | Solvent to feed ratio=6.68:1 | | | | Solvent to feed ratio=5.0:1 | | | |

STREAM (ABSORBER 30)

| Component (gallons/hr.) | 100 Tray | | | | 200 Tray | | | |
|---|---|---|---|---|---|---|---|---|
| | 51 | 53 | 59 | 57 | 51 | 53 | 59 | 57 |
| Methylacetylene (p.p.m.) | 140 | 190 | 60 | | 140 | 227 | <1 | |
| $C_3$'s | 6.1 | 6.1 | | | 6.1 | 6.1 | | |
| Isobutane | 2.0 | 2.0 | | | 2.0 | 2.0 | | |
| n-Butane | 20.2 | 20.2 | | | 20.2 | 20.2 | | |
| Isobutylene | 1.9 | 1.9 | | | 1.9 | 1.9 | | |
| 1-Butene | 571.9 | 570.6 | 1.3 | | 571.9 | 571.2 | 0.7 | |
| Trans-2-butene | 28.1 | 14.7 | 13.4 | | 28.1 | 12.0 | 16.1 | |
| Cis-2-butene | 3.5 | 0.5 | 3.0 | | 3.5 | 0.0 | 3.5 | |
| 1,3-butadiene | 366.3 | 1.2 | 365.1 | | 366.3 | 0.6 | 365.7 | |
| Oils | | | | 1,008 | | | | 418 |
| Furfural | | | | 5,081 | | | | 2,108 |
| Water | | | | 661 | | | | 274 |
| Total | 1,000 | 617.2 | 382.8 | 6,750 | 1,000 | 614.0 | 386.0 | 2,800 |
| | Solvent to feed ratio=6.75:1 | | | | Solvent to feed ratio=2.8:1 | | | |

From this example, in comparison with Example I wherein neopentane is separated 50-50 in the streams from the absorber, it can be seen that extractive distillation with the lower solvent-hydrocarbon feed ratio accompanied by more column trays divides the neopentane in a favorable 2 to 1 split in the streams from the absorber. Also, the methylacetylene is removed substantially completely with the butene-1 stream from the absorber rather than with the butadiene stream as in Example I.

This invention, in addition to providing removal of neopentane and methylacetylene from the desired product streams, permits a reduction in energy requirements of the absorber with a lower temperature heat source to reboil the column, a higher tray efficiency as evidenced by the contaminant separations, and greater throughput of feed with equivalent separation and recovery.

From the disclosure it will be understood that we have provided a method for improving the operation of a dehydrogenating process. It will be evident from our invention that the utilization of a recycle stream as feed to a deoiling column and fresh material as reflux thereto, eliminates much of the utility heating vaporization requirement for such deoiling operations when feed to dehydrogenation operations is provided therefrom.

Further, extractive distillation operations are enhanced considerably by the use of lower solvent to feed ratios in that improved separations, particularly of minor components, are provided at reduced operating costs, even though some increase in the number of fractionating trays employed must be provided.

Many variations and modifications of the invention will be apparent to one skilled in the art which will not depart from the spirit and scope of this invention.

Although this invention has been described with specific reference to the dehydrogenation of butane and $C_4$ hydrocarbons, it is equally applicable to other processes, such as the dehydrogenation of isoamylenes to form isoprene. Furthermore, this invention is applicable for use with any vapor phase catalytic processes wherein at least two feed streams are introduced and at least one stream is substantially pure and at least one stream contains heavy components.

That which is claimed is:

1. In a process for producing normal butenes comprising catalytically dehydrogenating normal butane in a zone, separating the resulting effluent to recover streams containing substantially butene-1, butene-2, and normal butane, and recycling said recovered normal butane stream to said zone, the improvement which comprises passing said recovered normal butane stream to a deoiler column as feed thereto, and introducing fresh normal butane to said column as reflux prior to introduction of same into said zone.

2. In a process for producing normal butenes comprising catalytically dehydrogenating normal butane in a zone, subjecting the effluent from said zone to absorption oil separation for removing light gases, fractionally distilling propane from said remaining effluent, deoiling the remaining effluent, removing butene-1 from the remaining effluent, subjecting the remaining effluent to selective solvent extraction for recovery of butene-2 and normal butane, deoiling the recovered normal butane, and recycling the deoiled normal butane to said zone, the improvement which comprises passing said recovered normal butane to a deoiling zone as feed thereto, introducing fresh normal butane to said deoiling zone as reflux thereto, and recovering deoiled normal butane from said deoiler and introducing same into said zone.

3. The process according to claim 2 wherein said selective solvent is furfural.

4. In a process for producing butadiene comprising catalytically dehydrogenating a normal butane in a first zone, recovering streams containing substantially butene-1, butene-2, and normal butane from the effluent of said first zone, deoiling and recycling said recovered normal butane stream to said first zone, introducing said butene-1 and butene-2-containing streams to a second zone for catalytically dehydrogenating them, recovering streams containing substantially butene-2, butene-1, and butadiene, deoiling and recycling the recovered butene-2 and butene-1 streams to said second dehydrogenation zone, the improvement which comprises passing said recovered normal butane-containing stream to a first deoiler zone as feed, passing fresh normal butane to first deoiler zone as reflux, recovering deoiled normal butane from said first deoiler zone and introducing same into said first dehydrogenating zone, passing said first recovered butene-2 containing stream to a second deoiling zone as feed thereto, passing a substantially pure butene-containing stream to said second deoiler zone as reflux thereto, recovering deoiled butene-2 stream therefrom, and introducing said deoiled butene-2 containing stream into said second dehydrogenation zone.

5. In a two-stage dehydrogenation process for producing butadiene comprising catalytically dehydrogenating normal butane in a first zone, subjecting the effluent from said first zone to absorption oil separation for removal of light gases, fractionally distilling propane from said resulting effluent, deoiling the resulting effluent, removing butene-1 from the resulting effluent, subjecting the resulting effluent to selective solvent extraction for recovery of streams containing substantially butene-2 and normal butane, deoiling said recovered normal butane, recycling said deoiled normal butane to said first zone, deoiling said recovered butene-2 stream, passing said deoiled butene-2 stream to a second dehydrogenation zone, subjecting the effluent from said second zone to absorption oil separation for removal of light gases, fractionally distilling propane from said second remaining effluent, fractionally distilling butene-2 from the remaining effluent, deoiling said removed butene-2 and recycling the resulting deoiled butene-2 to said second dehydrogenation zone, subjecting the resulting second effluent to selective solvent extraction for recovery of butene-1, and fractionally distilling the resulting second effluent for removal of heavy materials and recovery of butadiene, the improvement which comprises passing said recovered normal butane stream to a deoiler zone as feed thereto, introducing fresh normal butane to said deoiler zone as reflux thereto, recovering deoiled normal butane from said first deoiler zone and introducing same into said first dehydrogenation zone, passing said first recovered butene-2 stream to a second deoiler zone as feed thereto, introducing a substantially pure butene stream as reflux to said second deoiler zone, and recovering deoiled butene from said second deoiler zone and introducing same into said second dehydrogenation zone.

6. The process according to claim 5 wherein said selective solvent is furfural.

7. In a process for producing butadiene comprising catalytically dehydrogenating butene in a zone, subjecting the effluent from said zone to absorption oil separation for removing light gases, fractionally distilling propane from said remaining effluent, fractionally distilling butene-2 from the remaining effluent, subjecting the remaining effluent to selective solvent extraction for recovery of butene-1, stripping the solvent from the resulting extract, and fractionally distilling the remaining extract for removal of heavy materials and recovery of butadiene, the improvement which comprises passing said distilled butene-2 and extracted butene-1 streams to a deoiler zone as feed thereto, introducing a substantially pure butene stream as reflux to said deoiler zone, and recoverying deoiled butene and introducing same to said dehydrogenation zone.

8. In a process for producing normal butenes comprising catalytically dehydrogenating normal butane in a zone, subjecting the effluent from said zone to absorption oil separation for removing light gases, fractionally distilling propane from said remaining effluent, deoiling the remaining effluent, removing butene-1 from the remaining effluent, subjecting the remaining effluent to selective solvent extraction for recovery of butene-2 and normal butane, deoiling the recovered normal butane, and recycling the deoiled normal butane to said zone, the improvement which comprises passing said recovered normal butane to a deoiling zone as feed thereto, introducing fresh normal butane to said deoiling zone as reflux thereto, and recovering deoiled normal butane from said deoiler and introducing same into said zone, and maintaining the solvent to effluent ratio in said solvent extraction less than 5.5:1.

9. In a two-stage dehydrogenation process for producing butadiene comprising catalytically dehydrogenating normal butane in a first zone, subjecting the effluent from said first zone to absorption oil separation for removal of light gases, fractionally distilling propane from said resulting effluent, deoiling the resulting effluent, removing butene-1 from the resulting effluent, subjecting the resulting effluent to selective solvent extraction for recovery of streams containing substantially butene-2 and normal butane, deoiling said recovered normal butane, recycling said deoiled normal butane to said first zone, deoiling said recovered butene-2 stream, passing said deoiled butene-2 stream to a second dehydrogenation zone, subjecting the effluent from said second zone to absorption oil separation for removal of light gases, fractionally distilling propane from said second remaining effluent, fractionally distilling butene-2 from the remaining effluent, deoiling said removed butene-2 and recycling the resulting deoiled butene-2 to said second dehydrogenation zone, subjecting the resulting second effluent to selective solvent extraction for recovery of butene-1, and fractionally distilling the resulting second effluent for removal of heavy materials and recovery of butadiene, the improvement which comprises passing said recovered normal butane stream to a deoiler zone as feed thereto, introducing fresh normal butane to said deoiler zone as reflux thereto, recovering deoiled normal butane from said first deoiler zone and introducing same into said first dehydrogenation zone, passing said first recovered butene-2 stream to a second deoiler zone as feed thereto, introducing a substantially pure butene stream as reflux to said second deoiler zone, and recovering deoiled butene from said second deoiler zone and introducing same into said second dehydrogenation zone, and maintaining the solvent to effluent ratios in said extraction of said first dehydrogenation zone effluent below 5.5:1 and in said extraction of said second dehydrogenation zone effluent below 4:1.

10. In a process for producing isoprene comprising catalytically dehydrogenating isoamylenes in a zone, separating the dehydrogenation zone effluent to recover separate isoprene and isoamylene streams, withdrawing the isoprene stream as product, deoiling the isoamylene stream, and recycling the deoiled isoamylene stream to said zone, the improvement which comprises passing said recovered isoamylenes to a deoiling zone as feed thereto, introducing fresh isoamylenes to said deoiling zone as reflux thereto, and recovering deoiled isoamylenes from said deoiling zone and introducing same into said dehydrogenation zone.

11. In a vapor phase catalytic process wherein at least two feed streams are introduced and at least one stream contains heavy components and at least one stream is substantially pure, the improvement which comprises introducing the substantially pure streams to a deoiling zone as reflux thereto, introducing the streams containing heavy components to said deoiling zone as feed thereto, and recovering a deoiled stream from said deoiling zone as feed to said process.

References Cited

UNITED STATES PATENTS

| | | | |
|---|---|---|---|
| 2,401,758 | 6/1946 | Hastings et al. | 260—681.5 |
| 3,004,083 | 10/1961 | Siedenstrang et al. | 260—680 |
| 3,111,547 | 11/1963 | Magness | 260—680 |

DELBERT E. GANTZ, *Primary Examiner.*

G. E. SCHMITKONS, *Assistant Examiner.*